United States Patent

[11] 3,568,650

| [72] | Inventor | James R. Albrich<br>Portland, Oreg. |
|---|---|---|
| [21] | Appl. No. | 781,361 |
| [22] | Filed | Dec. 5, 1968 |
| [45] | Patented | Mar. 9, 1971 |
| [73] | Assignee | Sonic-Air, Inc.<br>Lake Oswego, Oreg. |

[54] SUPERCHARGER AND FUEL INJECTOR ASSEMBLY FOR INTERNAL COMBUSTION ENGINES
9 Claims, 6 Drawing Figs.

[52] U.S. Cl................................................... 123/119,
415/181
[51] Int. Cl........................................... F02b 33/40
[50] Field of Search........................................ 123/119
(C); 230/120 (S), 114 (H), (Inquired); 415/181

[56] References Cited
UNITED STATES PATENTS

| 2,404,323 | 7/1946 | Staley........................... | 123/119 |
| 2,427,136 | 9/1947 | Hagen.......................... | 230/114 |
| 2,435,236 | 2/1948 | Redding....................... | 415/181 |
| 2,628,768 | 2/1953 | Kantrowitz................... | 415/181 |
| 2,991,929 | 7/1961 | Stalker......................... | 230/120 |

FOREIGN PATENTS

| 767,094 | 10/1951 | Germany...................... | 123/119C |

Primary Examiner—Douglas Hart
Attorney—Oliver D. Olson

ABSTRACT: The open air intake end of a hollow housing has adjustable air control shutters to regulate intake air to the transonic rotary vane component of an air compressor. The high velocity air output from the rotor is straightened to axial flow by passage through a stator vane component of the compressor at which combustion fuel is metered to the high velocity air. The fuel-air mixture then is expanded into a collector chamber from whence it is delivered to the intake valve system of an internal combustion engine.

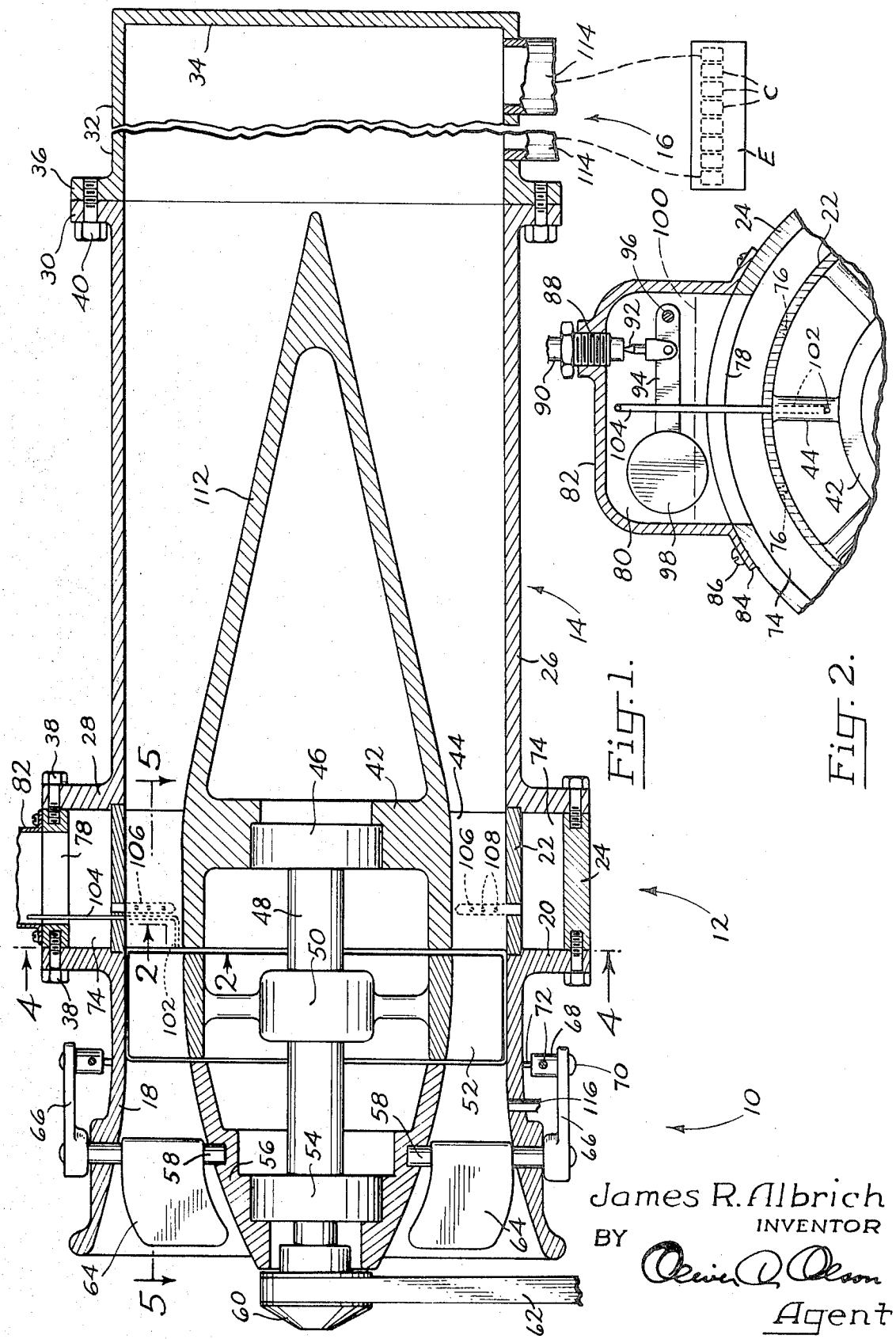

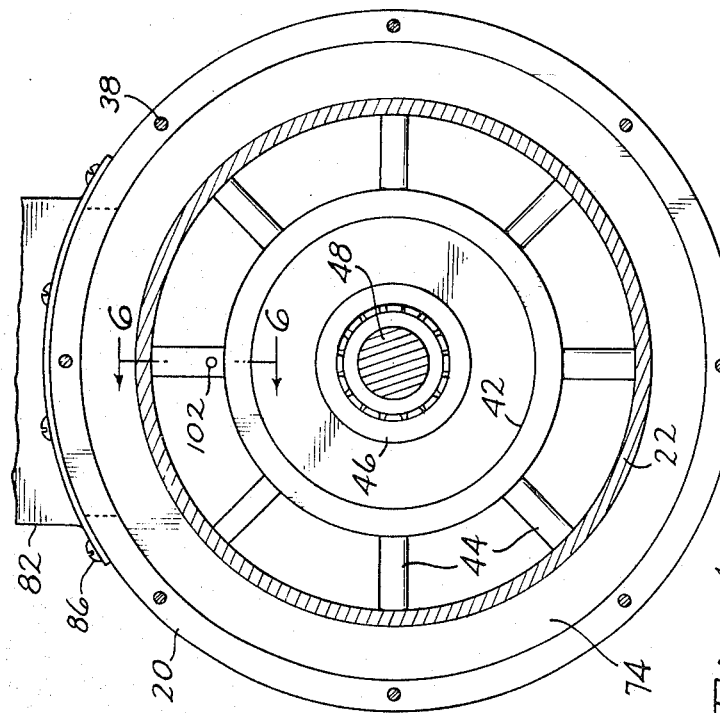
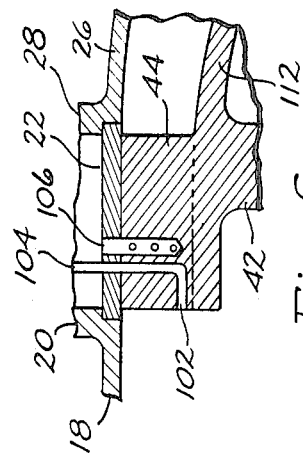
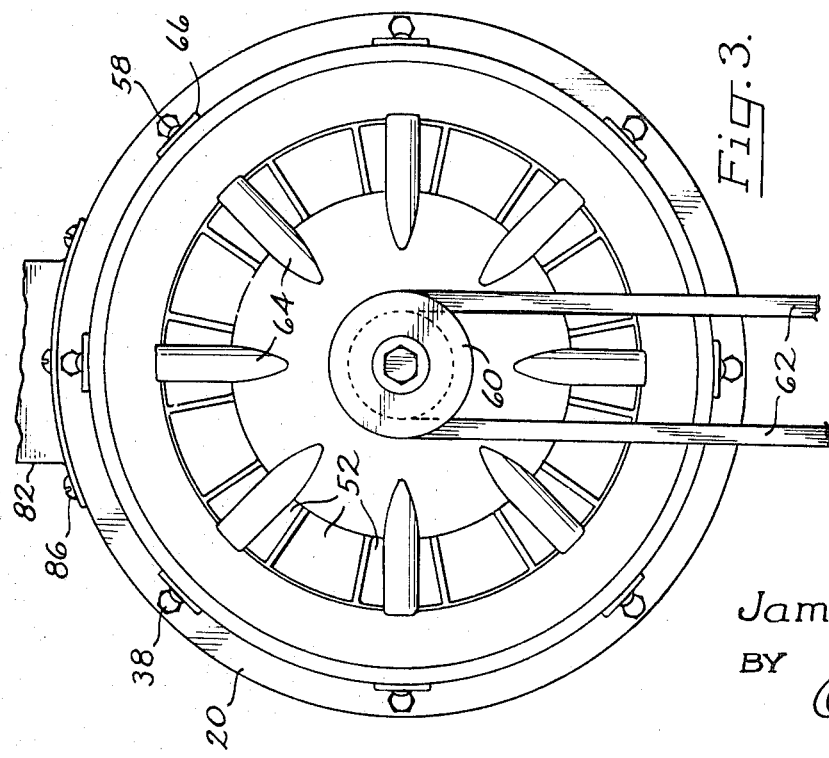
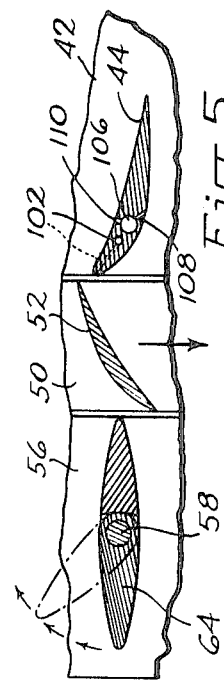
James R. Albrich
INVENTOR
BY
Agent

SUPERCHARGER AND FUEL INJECTOR ASSEMBLY FOR INTERNAL COMBUSTION ENGINES

BACKGROUND OF THE INVENTION

This invention relates to air blowers, particularly to air blowers having utility as superchargers for internal combustion engines, and more particularly to a supercharger and fuel injector assembly of novel construction for increasing the efficiency of engine operation.

Prior air blowers capable of providing a large volume of air under pressure are characterized by large size, multiple stages and large power source, all with correspondingly high cost of manufacture, operation and maintenance. Prior superchargers generally provide for the introduction of additional air in association with conventional carburetors. Such arrangements necessitate substantial and therefore costly modification of the carburetion system. Moreover, the velocity and flow characteristics of the additional air provide fuel-air mixtures which do not improve engine operation efficiency enough to justify the added cost.

SUMMARY OF THE INVENTION

In its basic concept the present invention provides a simplified air blower construction in which a one-stage compressor operates at transonic relative velocities to produce a large volume of air under pressure with maximum efficiency. When employed as a supercharger and fuel injector for internal combustion engines, it provides for the controlled introduction of combustion fuel into a controlled air stream at the point of highest air velocity, for maximum efficiency of mixing, and then uniform expansion of the mixture prior to delivery to the cylinders of an internal combustion engine.

It is by virtue of the foregoing basic concept that the principal objective of the present invention is achieved, namely to overcome the disadvantages of prior air blowers and supercharger systems as enumerated hereinbefore.

The foregoing and other objects and advantages of the present invention will appear from the following detailed description, taken in connection with the accompanying drawings of the preferred embodiment.

BRIEF DESCRIPTION OF THE DRAWINGS

FIG. 1 is a fragmentary, foreshortened, longitudinal section through a supercharger and fuel injector assembly embodying the features of the invention.

FIG. 2 is a fragmentary sectional view taken on the line 2—2 in FIG. 1.

FIG. 3 is a fragmentary end elevation as viewed from the left in FIG. 1.

FIG. 4 is a transverse section taken on the line 4—4 in FIG. 1.

FIG. 5 is a fragmentary sectional view taken on the line 5—5 in FIG. 1.

FIG. 6 is a fragmentary sectional view taken on the line 6—6 in FIG. 4.

DESCRIPTION OF THE PREFERRED EMBODIMENT

The supercharger and fuel injector assembly illustrated includes a hollow housing formed of a plurality of hollow sections joined together as an integral unit. Thus, there is provided an air intake section 10, a stator and fuel injector section 12, a fuel-air mixture diffuser section 14 and a collector section 16.

The air intake section comprises a hollow cylinder 18 open at both ends. The intake end of the cylinder is of outwardly flared, bellmouth shape. The opposite, outlet end of the cylinder is provided with an outwardly projecting annular connector flange 20. The fuel injector section of the housing comprises a pair of concentric annular rings 22 and 24. The diffuser section of the housing comprises a hollow cylinder 26 provided with outwardly projecting annular connecting flanges 28 and 30 at its opposite ends. The collector section of the housing comprises a hollow cylinder 32 closed at one end by the wall 34 and provided at its opposite end with the outwardly extending annular connecting flange 36.

The stator and fuel injector section of the housing is interposed between the air intake section and the diffuser section. The inner ring 22 is seated at its opposite open ends in annular grooves provided in the facing flanged ends of the air intake section and diffuser section. The outer ring 24 is spaced concentrically outward of the inner ring and is secured between the flanges by the securing bolts 38.

The abutting flanged ends of the diffuser section and the collector section are secured together by bolts 40.

It will be understood that suitable seals are provided between the abutting components of the housing to provide liquid and air tight connections.

Disposed concentrically within and spaced from the housing is a fixed stator hub 42. Secured to this hub and radiating outwardly therefrom are a plurality of circumferentially spaced stator vanes 44. The outer ends of the vanes are secured to the inner ring 22 of the stator and fuel injector section of the housing. The stator vanes preferably have the air foil cross sectional shape illustrated in FIG. 5.

The stator hub mounts a bearing 46 which supports for rotation one end of the rotor drive shaft 48. Intermediate the ends of this shaft there is secured the hub 50 of a high speed rotor. Secured to this hub and projecting radially outward therefrom are a plurality of circumferentially spaced rotor vanes 52 which terminate at their outer ends adjacent the inner surface of the air intake cylinder. Like the stator vanes, the rotor vanes preferably have the air foil cross-sectional configuration shown in FIG. 5. The stator and rotor assembly forms an air compressor, as will be apparent, with the stator vanes functioning to straighten or minimize the swirl of compressed air from the rotor vanes, so as to achieve substantially axial flow of air at the inlet of the diffuser section.

The reduced end section of the rotor drive shaft 48 opposite the bearing 46 is supported by the bearing 54 mounted in the fixed, central cone 56. This cone is supported in fixed position concentrically within the housing by means of the radially extending pins 58. The inner end of each pin is seated in a bearing socket in the cone and the outer end of the pin extends outwardly through an opening in the cylinder 18 forming the intake section of the housing.

The projecting end of the reduced section of the rotor drive shaft 48 mounts a pulley 60 which receives the drive belt 62. The opposite end of the drive belt is supported by a pulley (not shown) which is driven by the internal combustion engine to which the supercharger and fuel injector assembly of the present invention is attached. The drive connection of the belt to the engine is chosen to provide rotational speeds of the rotor vane assembly through the transonic range to a maximum in excess of 60,000 r.p.m. In this manner high relative air velocities through the fuel injector section are maintained at all engine speeds, to insure maximum mixing of fuel and air.

Means is provided for regulating the amount of intake air to the compressor. In the embodiment illustrated this means comprises a plurality of shutters 64 each secured to one of the pins 58 for pivotal movement therewith. The outer end of each pin is connected to one end of an arm 66 the opposite end of which pivotally supports the swivel block 68 by means of the pivot pin 70. Interconnecting all of the swivel blocks is an annular control ring 72 of wire or other suitable material. Accordingly, as the control ring is rotated about the longitudinal axis of the housing, the arms 66 pivot the pins 58 and connected shutters between open and closed positions. During axial rotation of the control ring the latter also moves longitudinally with respect to the housing. This axial rotation and longitudinal movement of the ring is effected by appropriate connection of it or one of the swivel blocks to the accelerator (not shown) of the internal combustion engine.

The annular space 74 between the concentric rings 22 and 24 forming the fuel injector section of the housing, forms a manifold chamber by which to inject combustion fuel into the spaces between adjacent stator vanes. Fuel may be delivered to this manifold chamber by any suitable means, such as a fuel line communicating the manifold space with a fuel supply tank. Also, the fuel in the manifold chamber may be injected into the space between stator vanes simply by means of openings 76 through the inner ring located between stator rings (FIG. 2).

In the preferred embodiment illustrated, a central top section of the outer ring 24 is removed to provide an opening 78 which communicates the manifold chamber with a fuel pressurizing chamber 80 provided by the housing 82. A peripheral flange 84 on the lower end of the housing is adapted to be secured in sealing relation to the ring by such means as the screws 86. Extending through the top wall of the housing is a fluid line fitting 88. The outer end of the fitting connects one end of a fluid conduit 90 the opposite end of which is connected to the output of a conventional fuel pump (not shown). The inner end of the fitting provides the seat for the control valve 92. The valve is mounted pivotally on a float arm 94, intermediate the ends of the latter. One end of the arm is mounted pivotally within the housing, by means of the pivot pin 96, and the opposite end of the arm supports a hollow float.

Thus, as best illustrated in FIG. 2, as the liquid fuel level 100 in the housing drops, the float arm pivots counterclockwise to unseat the valve and admit more liquid fuel from the top. As the float rises with the fuel level in the housing, the valve approaches its seating position, to restrict the delivery of fuel.

Means preferably is provided for variably pressurizing the space above the fuel level in the housing, to provide uniform but varying fuel injection to the spaces between the stator vanes. In the embodiment illustrated, this means is provided by the passageway 102 in tee uppermost stator vane. This passageway extends from the end of the vane facing the rotor vanes 52 upwardly through the inner ring 22 where it communicates with the conduit 104. The conduit projects upward into the housing and terminates adjacent the top wall of the latter, above the maximum fuel level 100 in the housing Accordingly, air from the rotor is forced through the passageway 102 and conduit 104 into the chamber 80, and the degree of air pressure provided thereby is controlled by operation of the air adjust shutters 64.

As previously mentioned, combustion fuel may be injected from the manifold chamber 74 into the space between stator vanes by means of the openings 76. In the preferred arrangement illustrated each stator vane is provided with a radial passageway 106 which extends inward through the inner ring 22 and stator vane and terminates adjacent the inner end of the latter. A plurality of transverse passageways 108 and 110 (FIG. 5) through each stator vane communicates with the radial passageway. In the preferred arrangement illustrated in FIG. 5, the transverse passageways 108 communicating the radial passageway with the suction side of the stator blade are directed angularly outward in the direction of air travel to assist in breaking up the boundary layer and delay separation of air from the surface of the blade, whereby to increase blade efficiency. The transverse passageways 110 which communicate the radial passageway with the pressure side of the stator blade are directed substantially perpendicular to the direction of air flow, to enhance the mixing of fuel and air.

It is to be noted that the fuel is injected into the air stream at the point of highest velocity of the latter, namely in the area of the stator vanes at which the annular passageway through the housing is reduced to minimum volume. This insures maximum mixing of fuel and air and contributes materially to high operating efficiency of the compressor and therefore the engine, with minimum exhaust of solid particles.

The diffuser section of the housing contains a diffuser cone 112. The cone is formed integral with or otherwise secured to the hub 42 of the stator vane assembly and converges to its apex in the direction of air flow. The space between the cone and diffuser housing section cylinder 26 thus increases in volume progressively from the stator vanes to the apex of the cone. Accordingly, the fuel-air mixture from the stator assembly is caused to expand and to decrease in flow velocity. Uniform mixing of the fuel and air thus is achieved.

The fuel-air mixture from the diffuser is collected in the collector section 16 of the housing for delivery to the intake valve assembly of the internal combustion engine. For this purpose the collector section may be connected by any suitable means to the conventional intake manifold of the engine. For example, the end wall 34 of the collector section may be omitted and that end of the collector cylinder connected directly to the intake manifold.

In the preferred embodiment illustrated, the collector cylinder is provided with a plurality of longitudinally spaced, radially extending tubes 114 each of which communicates the interior of the collector section with an intake valve associated with a cylinder c of the engine E.

The operation of the supercharger and fuel injector assembly described hereinbefore is as follows:

When the internal combustion engine is operating under idle condition, the air control shutters 64 are closed and therefore minimum air pressure, supplied through the passageway 102 and conduit 104, exists in the float chamber 80. Minimum fuel therefore is being delivered to the spaces between the stator vanes from the fuel manifold chamber 74. The engine thus is operating under a condition of steady state fuel-air ratio, with the fuel control valve 92 adjusted to meter a minimum volume of fuel from the fuel pump to the float chamber.

Let it now be assumed that the operator of the vehicle depresses the throttle to achieve acceleration. The air control shutters thus are opened, allowing an increased mass flow rate of air to the compressor. Accordingly, the fuel-air ratio momentarily is reduced, leaning out the fuel mixture and closing the engine to accelerate under an unsteady state condition.

As the rotor vane section of the compressor increases in speed, the air pressure in the float chamber 80 increases, with consequent increase in fuel delivery to the spaces between stator vanes. As the fuel level 100 drops, the control valve opens to introduce more fuel. Simultaneously the air pressure at the stator increases, with consequent increase in velocity and mass flow rate of air through the stator. The fuel-air ratio increases progressively, approaching a higher steady state engine speed at which the fuel-air ratio eventually reaches a new value similar to that attained under idling conditions of the engine.

Let it now be assumed that the operator retracts the throttle to decelerate the vehicle. The air control shutters move to closed position, momentarily increasing the fuel-air ratio and consequently effecting a decrease in rotational speed of the rotor section of tee air compressor. Air pressure to the float chamber decreases, with consequent reduction in fuel delivery to the spaces between the stator vanes. As the level of fuel in the float chamber rises, the float elevates the control valve toward its seat to reduce the delivery of fuel from the fuel pump to the float chamber. The fuel-air ratio decreases progressively toward the lower steady state condition of the engine.

In order to comply with Federal regulations concerning air pollution, a conduit 116 may communicate the oil pan space of the engine with the air intake space of housing section 10 to provide recirculation of crankcase breather air through the engine.

Although the axial flow air compressor illustrated is preferred, other types, such as cascaded centrifugal compressors, may be utilized. Other changes also may be made. For example, the rotor may be driven by gear or other suitable type of connection to the internal combustion engine or to a separate source of rotary power. Other forms of air control mechanism may be substituted for the shutter assembly illustrated. The fuel injection component may be modified to accommodate the injection of gaseous and other types of fuels. The supercharger, without the fuel injection component may be utilized by itself in association with a conventional carburetion or other fuel metering system. The air blower also has utility of itself, i.e. without incorporation with an internal combustion engine.

I claim:
1. A supercharger and fuel injector assembly for an internal combustion engine having a plurality of cylinders, comprising:
 a. a hollow housing having an open air inlet at one end and a fuel-air mixture collector at the opposite end;
 b. an air compressor rotor in the housing for compressing inlet air and moving it toward the collector;
 c. drive means engaging the rotor for rotating the latter;
 d. an air compressor stator in the housing downstream of the rotor for minimizing the swirl of compressed air flow to the diffuser;
 e. fuel inlet means at the stator for introducing combustion fuel into the compressed air;
 f. diffuser means in the housing converging in the downstream direction from the stator for expanding the fuel-air mixture and slowing its movement toward the collector; and
 g. means for communicating the collector with said cylinders.

2. The assembly of claim 1 wherein the drive means is operable to rotate the rotor at transonic relative velocities.

3. The assembly of claim 1 including adjustable means at the inlet end of the housing for varying the opening thereof.

4. The assembly of claim 1 wherein the stator comprises a plurality of circumferentially spaced radial vanes, and the fuel inlet means comprises:
 h. an annular fuel distributor chamber;
 i. means communicating the fuel distributor chamber with a source of fuel; and
 j. circumferentially spaced passageway means communicating the fuel distributor chamber with the spaces between stator vanes.

5. The assembly of claim 4 wherein the passageway means extend radially outward through at least some of the stator vanes for communication at their outer ends with the fuel distributor chamber, and transverse ports in said stator vanes communicate the fuel passageway means with the air spaces between said vanes.

6. The assembly of claim 5 wherein the stator vanes have an air foil cross-sectional shape and the transverse ports communicating the fuel passageway with the suction side of the vanes are directed angularly outward in the direction of air travel.

7. The assembly of claim 6 wherein the transverse ports communicating the fuel passageway with the pressure side of the vanes are directed substantially normal to the direction of air travel.

8. The assembly of claim 4 wherein the means communicating the fuel distributor chamber with a source of fuel comprises:
 k. a fuel inlet chamber communicating with the fuel distributor chamber;
 l. control valve means communicating the fuel inlet chamber with a source of fuel; and
 m. float means in the fuel inlet chamber engaging the control valve means and operable to close the latter when the level of fuel in the inlet chamber reaches a predetermined maximum.

9. The assembly of claim 8 including air passage means communicating the fuel inlet chamber above said fuel level with the inlet opening in the housing.